US012431960B2

(12) United States Patent
Sharma

(10) Patent No.: US 12,431,960 B2
(45) Date of Patent: Sep. 30, 2025

(54) ALTERNATIVE DEVICE CELLULAR NETWORK SHORT WAVE TRIANGULATION SYSTEM

(71) Applicant: BANK OF AMERICA CORPORATION, Charlotte, NC (US)

(72) Inventor: Yash Sharma, Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 811 days.

(21) Appl. No.: 17/713,522

(22) Filed: Apr. 5, 2022

(65) Prior Publication Data

US 2023/0318694 A1 Oct. 5, 2023

(51) Int. Cl.
*H04B 7/155* (2006.01)
*H04W 40/22* (2009.01)
*H04W 64/00* (2009.01)

(52) U.S. Cl.
CPC ........ *H04B 7/15507* (2013.01); *H04W 40/22* (2013.01); *H04W 64/003* (2013.01)

(58) Field of Classification Search
CPC ....... H04W 4/021; H04W 4/02; H04W 4/029; H04W 40/22; H04W 64/003; H04W 84/047; H04B 7/15507; H04M 1/72457
See application file for complete search history.

(56) References Cited

U.S. PATENT DOCUMENTS

| | | | |
|---|---|---|---|
| 4,812,852 A | 3/1989 | Bent et al. | |
| 7,260,379 B2 | 8/2007 | Karaoguz et al. | |
| 7,412,517 B2 | 8/2008 | Jorgensen | |
| 7,761,075 B2 | 7/2010 | Cleveland et al. | |
| 8,971,817 B2 | 3/2015 | Morioka et al. | |
| 9,432,852 B2 | 8/2016 | Zhan et al. | |
| 9,627,743 B2 | 4/2017 | Jung et al. | |
| 9,761,944 B2 | 9/2017 | Anguera Pros et al. | |
| 10,079,683 B1 * | 9/2018 | Chebaro | H04L 63/06 |
| 10,462,679 B2 | 10/2019 | Basu Mallick et al. | |

(Continued)

FOREIGN PATENT DOCUMENTS

CN  112714408 A * 4/2021 ............ H04W 4/025

OTHER PUBLICATIONS

Ultra-wideband Positioning and Tracking—2017 (Year: 2017).*

*Primary Examiner* — Nizar N Sivji
(74) *Attorney, Agent, or Firm* — Moore & Van Allen PLLC; Nicholas C. Russell

(57) ABSTRACT

The invention provides an alternative device short wave beacon for mobile network boosting. As such, communication devices associated with computer terminal nodes, such as automated teller machines (ATM) are converted and integrated with beacons to allow transmission of short wave mobile network transmission to boost active signal strength of active mobile networks. The system does this by performing triangulation of a mobile network signal that is being broadcasted by mobile phone of a user. Once the location is triangulated, the system identifies the computer terminal nodes located in that area and initiates the activation of short wave mobile network boosting via the beacons. In this way, where the triangulation happens, instead of completely relying longer wave transmission, the invention allows the mobile phone of the user to use short wave transmissions from the beacons to amplify the mobile network connection of the user.

17 Claims, 5 Drawing Sheets

(56) References Cited

U.S. PATENT DOCUMENTS

| | | |
|---|---|---|
| 10,701,645 B2 | 6/2020 | Zhan |
| 11,092,665 B2 | 8/2021 | Maynard et al. |
| 11,290,920 B2 | 3/2022 | Cui et al. |
| 2002/0128020 A1 | 9/2002 | Carlson et al. |
| 2009/0046616 A1 | 2/2009 | Martinez et al. |
| 2011/0300837 A1* | 12/2011 | Misiag .................... H04W 4/18 |
| | | 455/414.2 |
| 2013/0346240 A1* | 12/2013 | Roberts ................ H04W 4/024 |
| | | 455/456.3 |
| 2015/0005011 A1* | 1/2015 | Nehrenz ............... H04W 4/185 |
| | | 455/456.3 |
| 2015/0116162 A1 | 4/2015 | Caimi et al. |
| 2017/0325203 A1* | 11/2017 | Seo ....................... H04L 5/0023 |
| 2018/0206065 A1* | 7/2018 | Moshfeghi ............ H04W 4/027 |
| 2022/0247481 A1* | 8/2022 | Zhan .................. H04B 7/15535 |
| 2022/0256428 A1* | 8/2022 | Vivanco ................ H04W 24/10 |
| 2023/0007021 A1* | 1/2023 | Christian ................ H04W 4/80 |

\* cited by examiner

ALTERNATIVE DEVICE CELLULAR NETWORK SHORT WAVE TRIANGULATION SYSTEM

BACKGROUND

With improvements in mobile networks, there is still some network lag or interference due to obstructions. With these obstructions, a need exists for the use of a short wave triangulation system in order to boost long wave network connectivity in areas with obstructions.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

The invention provides an alternative device short wave beacon for mobile network boosting. As such, communication devices associated with computer terminal nodes, such as automated teller machines (ATM) are converted and integrated with beacons to allow transmission of short wave mobile network transmission to boost active signal strength of active mobile networks. The system does this by performing triangulation of a mobile network signal that is being broadcasted by mobile phone of a user. Once the location is triangulated, the system identifies the computer terminal nodes located in that area and initiates the activation of short wave mobile network boosting via the beacons. In this way, where the triangulation happens, instead of completely relying longer wave transmission, the invention allows the mobile phone of the user to use short wave transmissions from the beacons to amplify the mobile network connection of the user.

The invention provides a system, method, and computer program product for short wave triangulation network boosting, the invention comprises: integrating a mobile network beacon into existing applications at computer terminal nodes; identifying an active mobile network connected user device, wherein the active mobile network connected user device is identified by the computer terminal node; triangulating the active mobile network connected user device location between the computer terminal nodes; activating the mobile network beacon on the computer terminal nodes that triangulate the active mobile network connected user device; and transmitting short wave communications from the computer terminal nodes to the active mobile network connected user device.

In some embodiments, integrating mobile network beacon components into existing applications at the computer terminal node further comprises accessing near field and short wave communications available to the computer terminal node.

In some embodiments, the invention further comprises identifying one or more computer terminal nodes within a mobile network and connect the one or more computer terminal nodes for triangulation.

In some embodiments, the active mobile network connected user device is a weak network connection due to obstructions in a geographical area of the user device.

In some embodiments, the computer terminal nodes are located in a geographic area with obstructions.

In some embodiments, transmitting short wave communications from the computer terminal nodes to the active mobile network connected user device generates a mobile network connection boost for the user device.

In some embodiments, the mobile network beacon comprises a 5G booster module for transmission and boosting of a mobile network using short wave communication.

In some embodiments, the computer terminal node is an automated teller machine (ATM).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
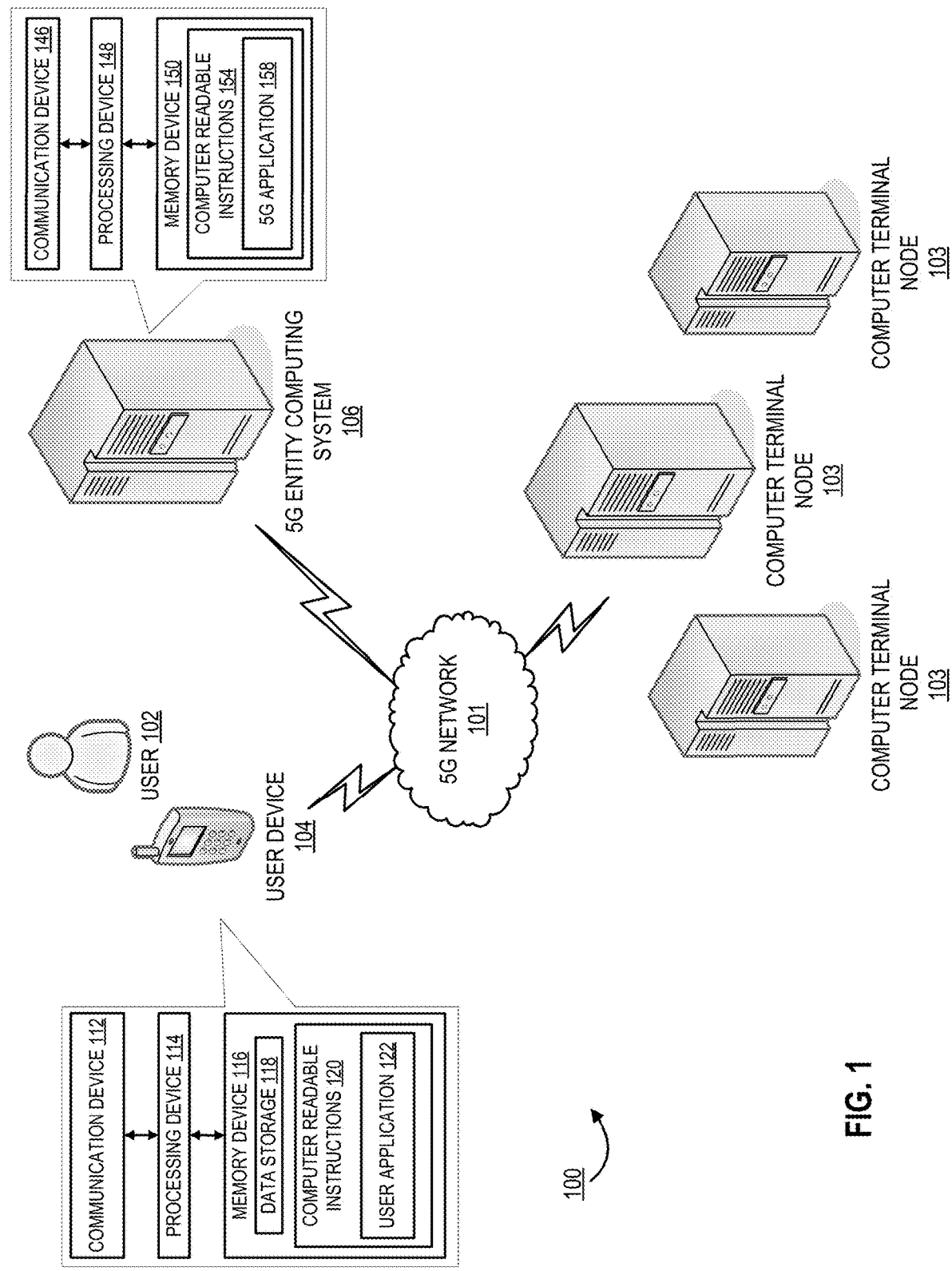
Figure 2:
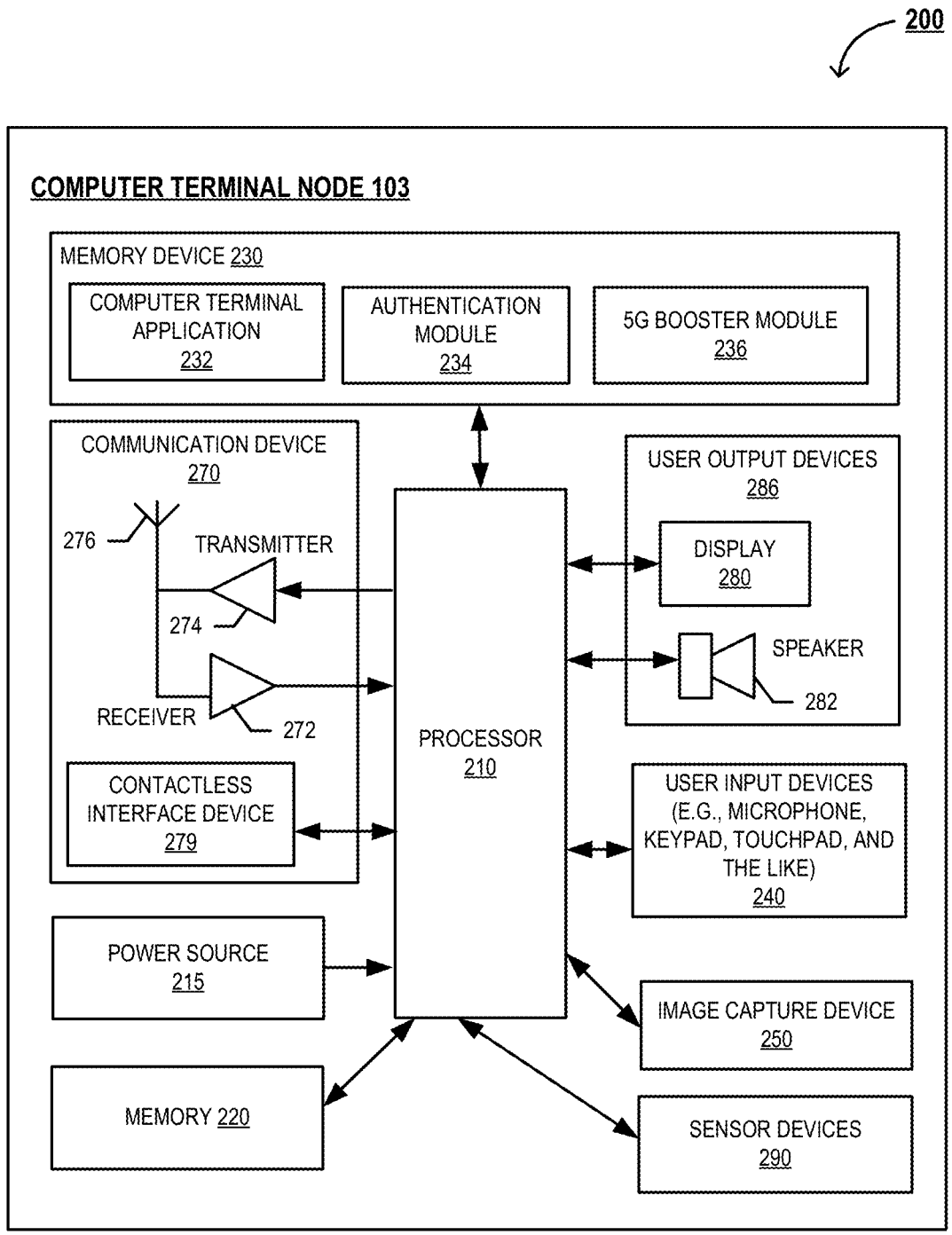
Figure 3:
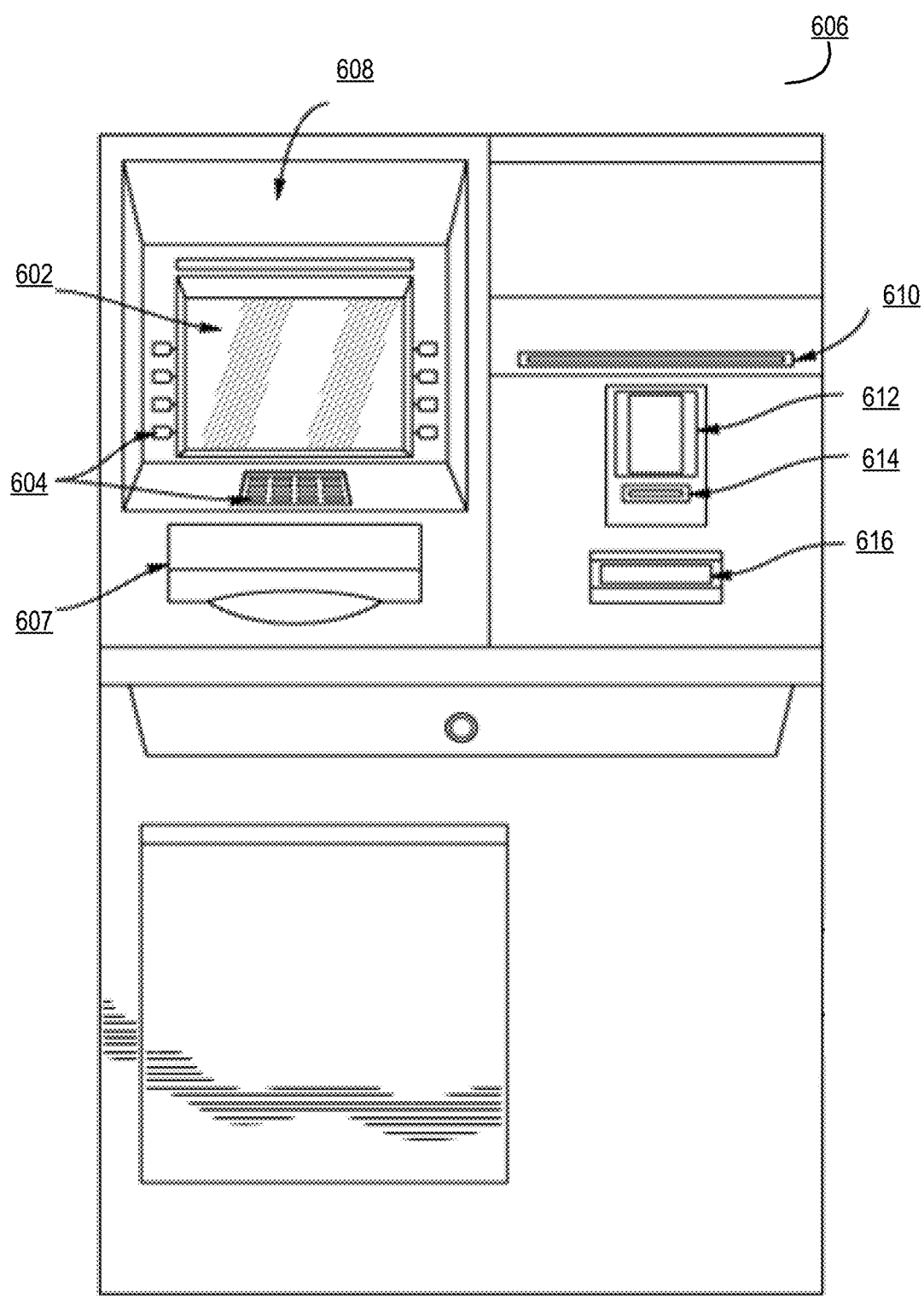
Figure 4:
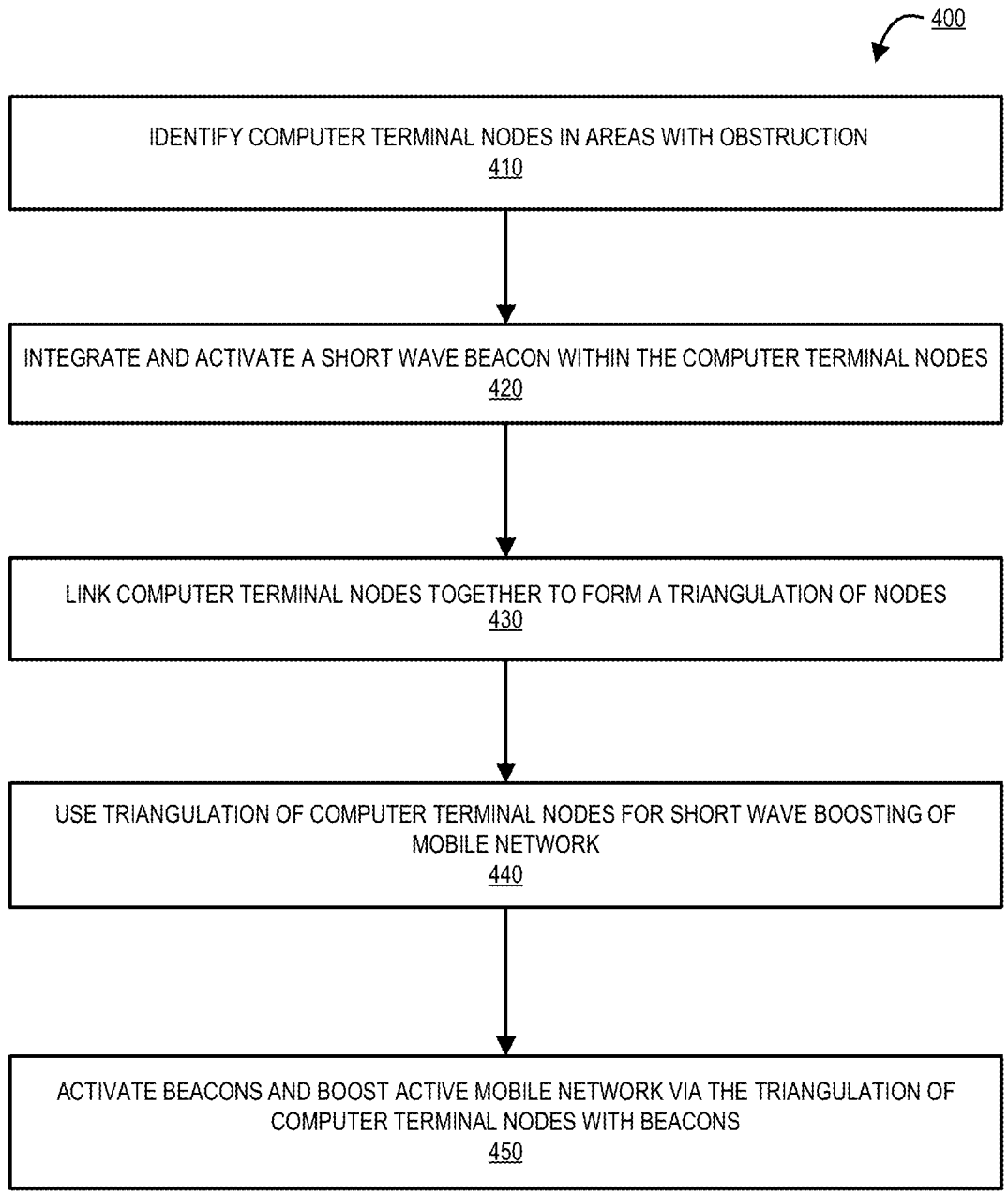
Figure 5:
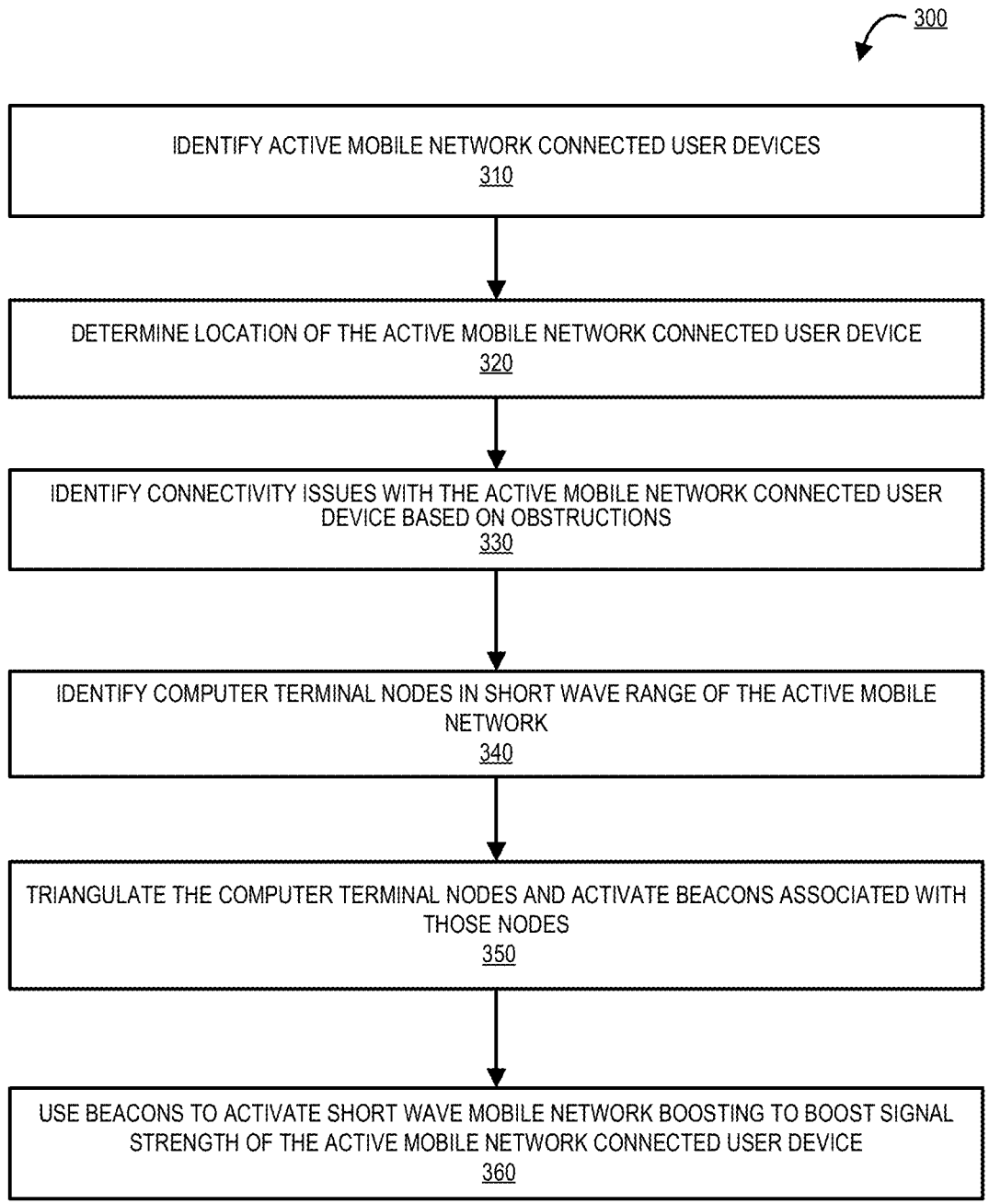

Having thus described embodiments of the invention in general terms, reference will now be made to the accompanying drawings, wherein:

FIG. 1 illustrates a mobile network short wave triangulation system network, in accordance with one embodiment of the present disclosure;

FIG. 2 is a block diagram illustrating the computer terminal node system, in accordance with one embodiment of the present disclosure;

FIG. 3 is a representative illustration of a computer terminal node, in accordance with one embodiment of the present disclosure;

FIG. 4 is a flow diagram illustrating a process for integrating the mobile network short wave triangulation system, in accordance with one embodiment of the present disclosure; and FIG. 5 is a flow diagram illustrating a process for using beacons for active mobile network boosting via the triangulation system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform location-based data management. Accordingly, the entity system may comprise 5G mobile networks (e.g., 5G towers, transmitters, receivers, or the like), blockchain database servers, Internet-of-Things ("IoT") devices, networked terminals, mobile smartphones, smart devices (e.g., smart watches), and/or other types of computing systems or devices along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device (otherwise described as a mobile computing system), such as a smartphone, tablet, single board computer, smart device, laptop, wearable device, or the like. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein. "Service" as used herein includes any task, labor, product, or the like provided to a user from a third party service provider that may include a company, individual, or the like.

With the implementation of 5G or newer mobile networks, it has been identified that long wave travel is used to cover network communication across longer distances while short waves are used to transmit clearer through obstructions. As such, in some cities where there are a lot of obstructions 5G signals are not as strong due to the nature of the mobile network construct. As such, the system allows for automated teller machines (ATM) to act as beacons for receiving and transmitting data for 5G boosting and transmission. The system does this by performing triangulation of a mobile network signal that is being broadcasted by mobile phone of a user. Once the location is triangulated, the system identifies the ATMs located in that area and initiates the activation of short wave mobile network boosting via beacons located on the ATM. In this way, where the triangulation happens, instead of completely relying on cell phone towers and longer wave transmission, the system allows the mobile phone of the user to use short wave transmissions from the ATM beacons to amplify the mobile network connection of the user.

The invention provides an alternative device short wave beacon for mobile network boosting. As such, communication devices associated with computer terminal nodes, such as automated teller machines (ATM) are converted and integrated with beacons to allow transmission of short wave mobile network transmission to boost active signal strength of active mobile networks. The system does this by performing triangulation of a mobile network signal that is being broadcasted by mobile phone of a user. Once the location is triangulated, the system identifies the computer terminal nodes located in that area and initiates the activation of short wave mobile network boosting via the beacons. In this way, where the triangulation happens, instead of completely relying longer wave transmission, the invention allows the mobile phone of the user to use short wave transmissions from the beacons to amplify the mobile network connection of the user.

Turning now to the figures, FIG. 1 illustrates a mobile network short wave triangulation system network operating environment 100, in accordance with one embodiment of the present invention. In particular, FIG. 1 illustrates a 5G entity computing system 106 that is operatively coupled, via a 5G network 101 to the user device 104 and/or an computer terminal node 103. In such a configuration, the 5G entity computing system 106 may transmit information to and receive information from the user device 104 and/or the computer terminal node 103. It should be understood that FIG. 1 illustrates only an exemplary embodiment of the system environment 100, and it will be appreciated that in other embodiments one or more functions of the systems, devices, or servers as depicted in FIG. 1 may be combined into a single system, device, or server. In other embodiments, a single system, device, or server as depicted in FIG. 1 may represent multiple systems, devices, or servers.

The 5G network 101 may be a system specific distributive network receiving and distributing specific network feeds and identifying specific network associated triggers. The 5G network 101 include one or more 5G radio towers, antennae, cell sites, base stations, telephone networks, cloud networks, radio access networks (RAN), WiFi networks, or the like. Additionally, the 5G network 101 may also include a global area network (GAN), such as the Internet, a wide area network (WAN), a local area network (LAN), or any other type of network or combination of networks. Accordingly, the 5G network 101 may provide for wireline, wireless, or a combination wireline and wireless communication between devices on the 5G network 101.

The 5G network 101 as described herein confers many technological benefits over conventional network systems. For instance, the 5G network 101 may support network slicing to allow mobile service providers to generate virtualized mobile networks on a per-device basis, with each virtualized mobile network having certain defined features and performance standards. As a result, an entity may tailor the 5G network 101 to certain devices which may require higher bandwidth and/or lower latency connections than is available from conventional networks. Accordingly, the 5G network 101 may improve the efficiency and/or effectiveness of various processes in multiple different scenarios and use cases, as will be further described herein.

The user device 104 may be operated by a user 102. The user device 104 may be, for example, a portable device such as a mobile phone, smart phone, personal data assistant (PDA), laptop, or the like, though it is within the scope of the disclosure for the user device 104 to be a stationary device such as a desktop computer. The user device 104 generally comprises a communication device 112, a processing device 114, and a memory device 116. The processing device 114 is operatively coupled to the communication device 112 and the memory device 116. The processing device 114 uses the communication device 112 to communicate with the 5G network 101 and other devices on the 5G network 101, such as, but not limited to the 5G entity computing system 106. As such, the communication device 112 generally comprises a modem, antennae, WiFi or Ethernet adapter, radio transceiver, or other device for communicating with other devices on the 5G network 101.

The user device 104 comprises computer-readable instructions 120 and data storage 118 stored in the memory device 116, which in one embodiment includes the computer-readable instructions 120 of a user application 122. In some embodiments, the user application 122 allows a user 102 to receive communications from and/or send communications to the 5G entity computing system 106.

As further illustrated in FIG. 1, the 5G entity computing system 106 may comprise a communication device 146, a processing device 148, and a memory device 150. The 5G entity computing system 106 may be owned and/or operated by an entity such as a mobile service provider, financial institution, business organization, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the 5G network 101 and other devices on the 5G network 101, such as, but not limited to the user device 104 and/or the computer terminal node 103. The system generally comprises a modem, antennae, WiFi or Ethernet adapter, radio transceiver, or other device for communicating with other devices on the 5G network 101.

As further illustrated in FIG. 1, the 5G entity computing system 106 comprises computer-readable instructions 154 stored in the memory device 150, which in one embodiment includes the computer-readable instructions 154 of a 5G application 158. In some embodiments, the memory device 150 includes data storage 152 for storing data related to the system environment, but not limited to data created and/or used by the 5G application 150. The 5G application 158 may comprise computer-executable program code which may instruct the processing device 148 to perform certain logic, data processing, and data storing functions of the application to accomplish the entity's objectives. For example, the 5G application 158 may allow the entity to query, track, configure, or perform other types of communicative functions with the user device 104 and/or the computer terminal node 103.

In some embodiments, the operating environment may comprise one or more computer terminal node 103. The computer terminal node 103 may refer to an automated teller machine (ATM) associated with an entity or another terminal device at a geographical location.

The user device 104 and the computer terminal node 103 may each further include a processing device communicably coupled to devices as a memory device, output devices, input devices, a network interface, a power source, a clock or other timer, a camera, a positioning system device, a gyroscopic device, one or more chips, and the like.

The processing devices as described herein may include functionality to operate one or more software programs or applications, which may be stored in the memory device. For example, a processing device may be capable of operating a connectivity program, such as a web browser application. In this way, the user device 104 and/or the computer terminal node 103 may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the user device 104 and/or the computer terminal node 103. Alternatively, the applications may be pre-installed and stored in a memory in a chip.

The chip may include the necessary circuitry to provide 5G support and/or integration within the user device 104 and the computer terminal node 103. Generally, the chip will include data storage which may include data associated with the service that the user device 104 and the computer terminal node 103 may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the user device 104 and the computer terminal node 103. For instance, the functionality of the chip may be incorporated within the memory device and/or the processing device. In a particular embodiment, the functionality of the chip is incorporated in an element within the user device 104 and the computer terminal node 103. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable mobile system of the wireless telephone network that may be part of the network. In this regard, the user device 104 and/or the computer terminal node 103 may be configured to operate with one or more air interface standards, communication protocols, modulation types, and access types. By way of illustration, the user device 104 and/or the computer terminal node 103 may be configured to operate in accordance with any of a number of first, second, third, fourth, and/or fifth-generation communication protocols and/or the like. For example, the user device 104 and/or the computer terminal node 103 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The user device 104 and/or the computer terminal node 103 may also be configured to operate in accordance with non-mobile communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The user device 104 and/or the computer terminal node 103 may have an interface that includes user output devices and/or input devices. The output devices may include a display (e.g., a liquid crystal display (LCD) or the like) and a speaker or other audio device, which are operatively coupled to the processing device. The input devices, which may allow the user device 104 and/or the computer terminal node 103 to receive data from a user 202 and/or service provider 209, may include any of a number of devices allowing the user device 104 and/or the computer terminal node 103 to receive data from a user 202 and/or the service provider, such as a keypad, keyboard, touch-screen, touchpad, microphone, mouse, joystick, other pointer device, button, soft key, and/or other input device(s).

The user device 104 and/or the computer terminal node 103 may further include a power source. Generally, the power source is a device that supplies electrical energy to an electrical load. In some embodiment, power source may convert a form of energy such as solar energy, chemical energy, mechanical energy, or the like to electrical energy. Generally, the power source in a user device 104 and/or the computer terminal node 103 may be a battery, such as a lithium battery, a nickel-metal hydride battery, or the like, that is used for powering various circuits, e.g., the transceiver circuit, and other devices that are used to operate the user device 104 and/or the computer terminal node 103. Alternatively, the power source may be a power adapter that can connect a power supply from a power outlet to the user device 104 and/or the computer terminal node 103. In such embodiments, a power adapter may be classified as a power source "in" the user device 104 and/or the computer terminal node 103.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the user device 104 and/or the computer terminal node 103 described herein.

FIG. 2, illustrates a block diagram 200 of the computer terminal node 103 system in further detail, in accordance with some embodiments of the invention. As discussed previously, the computer terminal node 103 is, in some embodiments, an ATM and is configured to facilitate performance of user activities, and is configured to provide real-time interactive sessions for the user 102, using one or more communication channels established via the network 101. The computer terminal node 103 typically includes a processing device or a processor 210, memory device 230, storage memory 220 or datastore 220, and a communication device 270. As such, the computer terminal node 103, and the processor 210 is particular, is configured to perform at least a portion of the steps of the embodiments described herein, either based on executing computer readable instructions stored in the memory device 230, and/or based on receiving instructions, indications, or signals from other systems and devices such as the processing system 130, the user device 104, sensor devices 112, visual capture devices 114, and/or other systems. In some embodiments, the processing system 130 is configured to transmit control instructions to, and cause the processing device 210 to perform one or more steps of the embodiments presented herein. For example, the processing system 130 may detect a trigger event and transmit an indication to the processing device 210. In response to receiving the control signal from the system 130, the processing device 210 may initiate a presentation of environment parameters.

The processing device 210 may generally refer to a device or combination of devices having circuitry used for implementing the communication and/or logic functions of the computer terminal node 103. For example, the processing device 210 may include a control unit, a digital signal processor device, a microprocessor device, and various analog-to-digital converters, digital-to-analog converters, and other support circuits and/or combinations of the foregoing. Control and signal processing functions of the computer terminal node 103 may be allocated between these processing devices according to their respective capabilities.

The computer terminal node 103 may further include various components/devices in operative communication with and/or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the computer terminal node 103, such as an image capture device 250, sensor devices 290, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processing device 210 when it carries out its functions described herein.

As illustrated by FIG. 2, the memory device 230 typically comprises a computer terminal node application 232 (also referred to as a terminal application), an authentication module 234, a computer terminal node 5G booster module 236 stored therein. In some embodiments, the authentication module 234 is integral with the computer terminal node application 232. In some embodiments, the computer terminal node applications 232 and/or the authentication module 234 may be executable to initiate, perform, complete, and/or facilitate one or more portions of any embodiment described and/or contemplated herein, either independently or in response to receiving control instructions from the processing system 130. In some embodiments, the computer terminal node application/module 232 comprises computer readable instructions stored in the memory device 230, which when executed by the processing device 210, are configured to cause the processing device 210 to perform one or more steps of the embodiments presented herein, and/or cause the processing device to transmit control instructions to other components of the terminal 120 and other devices/systems in the network 101 to cause them to perform the steps. Generally, the computer terminal node application 232 is executable to receive activity instructions from the user and perform user activities and the various steps described herein. In some embodiments, the computer terminal node application 232 comprises a personal digital assistant for interfacing with the user at the terminal. The computer terminal node application 232 may be coupled to a computer terminal node 5G booster module 236 for locating and boosting short wave 5G communication networks between one or more computer terminal nodes 103. The 5G booster module 235 comprises a beacon for transmission and boosting of a mobile network using short wave communication that allows for better network quality around obstacles.

The computer terminal node 103 may require users to identify and/or authenticate themselves before the computer terminal node 103 may initiate, perform, complete, and/or facilitate a user activity. For example, in some embodiments, the computer terminal node 103 is configured (and/or the computer terminal node application 232 is executable) to authenticate a computer terminal node user based at least partially on a computer terminal node debit card, smart card, token (e.g., USB token, etc.), username, password, PIN, biometric information, and/or one or more other credentials that the user presents to the computer terminal node 103. Additionally or alternatively, in some embodiments, the computer terminal node 103 is configured to authenticate a user by using one-, two-, or multi-factor authentication. For example, in some embodiments, the computer terminal node 103 requires two-factor authentication, such that the user must provide a valid debit card and enter the correct PIN associated with the debit card in order to authenticate the user to the computer terminal node 103. However, either alternatively or in addition to the aforementioned authentication features, the computer terminal node 103 may require biometric authentication of the user 102 before initiating, performing, completing, and/or facilitating a user activity.

In some embodiments, the authentication module 234 comprises computer readable instructions that when executed by the processing device 210 cause the processing device to perform one or more functions and/or transmit control instructions to other components or devices to perform one or more authentication steps described herein. These authentication steps typically include requesting authentication credentials from the user via the user output devices 286 (for example, based on determining the desired authorization level for the user activity), activating pertinent sensors and devices for receipt of the credentials (sensor devices 290/image capture devices 250 for biometric credentials, card reader devices 240 for reading magnetic strips of the user's card(s), contact less interface device 279 for receiving authentication tokens from a user device via NFC channels, and the like), receiving authentication credentials, validating the credentials (for example based on retrieving user credentials from the datastore, memory 220, processing system 130 and/or database 118), and the like. That said, as shown, the processing device 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the computer terminal node 103, between the computer terminal node 103, particularly the processing device 210, and other devices or systems, such as the processing system 130, the user device 104, the authentication database 118, and the like. In this regard, the communication interface 270 comprises a transmitter 274, a receiver 272, a broadcasting device 276 to transmit and receive signals from corresponding devices via a suitable transmission medium or a communication channel. In some embodiments, the computer terminal node 103 is configured to be coupled/connected to other devices and systems via wired communication channels. In other embodiments, the computer terminal node 103 is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the computer terminal node 103 may include a transceiver, i.e., one or more antennas and and/or other electronic circuitry, devices, and software, for receiving data when a device is held close to or tapped at a suitable location of the computer terminal node 103.

The user interface of the computer terminal node 103 may include user input devices 240 and user output devices 286, as illustrated by FIG. 2. The user interface of the computer terminal node 103 is typically configured to facilitate the interactive sessions with the user. The user output devices 286 typically include a display 280 (e.g., a liquid crystal display, a touchscreen display, and/or the like) which is operatively coupled to the processing device 210. In some embodiments, where the computer terminal node 103 requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface 126 may include any number of user input devices 240 allowing the computer terminal node 103 to transmit/receive data to/from the user 102, such as a keypad, keyboard, touch-screen, touchpad, microphone, mouse, joystick, other pointer device, button, soft key, and/or other input device(s). A printer that can print paper receipts may also be incorporated into the computer terminal node 103.

As illustrated by FIG. 2, the computer terminal node may further comprise an image capture device 250. The image capture device 250 typically comprises cameras and other audio, video and image capture devices. The image capture device 250 is configured to capture images and/or video streams, typically in real-time, of a predetermined proximity area in the vicinity of the computer terminal node 103 location. The images and/or video streams may be analyzed by the computer terminal node 103 to determine the presence and position of the user, other individuals or objects and their movement in the proximity area, to identify the user for authentication or facial recognition purposes, and the like. In some embodiments, the system is configured to present a customized interface for the user based on identifying the user using facial recognition.

In some embodiments, the computer terminal node further comprises sensor devices 290. In some embodiments, the processor 210 communicates with, transmits instructions, and/or receives signals from the sensor devices 290, in real-time for detecting the presence of the users or other individuals, determining user location, capturing authentication credentials for the user, determining parameters associated with the user, determining trigger events, capturing one or more parameters associated with the environment or physical location of the computer terminal node 103, and the like.

FIG. 3 provides a representative illustration of a computer terminal node 606, in accordance with one embodiment of the present invention. In some embodiments, the computer terminal node 606 is a representative ATM. In some embodiments, the representative ATM may comprise features similar to features found on a standard ATM. The lighting means 608 may be located above the display 602 that may provide a customer light for use during an ATM transaction. Of note, the display 602 may be vertically adjusted or horizontally adjusted along tracks or the like to position itself across the entire ATM 606. While currently illustrated in the upper left corner of the ATM 606, one will appreciate that the display may move to the right upper corner or below to the lower corners of the ATM 606 and/or anywhere in between if necessary. The lighting means 608 may also be moved with the ATM display 602 and provide the customer a safety mechanism to aid in the ATM transaction.

The cash receptacle 607 may provide the customer means for receiving cash that the customer requests for a withdraw through the ATM transaction. In some embodiments, the ATM 606 may also include a contactless identification sensor 612, a contact identification sensor 614 such as a debit or ATM card acceptor, a keypad 604, a receipt receptacle 610, and a deposit receptacle 616. In some embodiments, the contactless identifier 612 and/or the contact identifier 614 may provide the ATM 606 means of receiving identification from the customer. The customer may provide contactless or contact identification means through the ATM 606. The identification means using the contactless or contact identifications may be provided through several mechanisms, including, but not limited to, biometric identification, laser identification, magnetic strip identification, barcode identification, radio frequency (RF), a character recognition device, a magnetic ink, code readers, wireless communication, debit card scanning, ATM card scanning, and/or the like. After the authentication has been read, the system may provide the authentication to the financial institution to authorize an ATM transaction.

In some embodiments, the keypad 604 may provide for identification of the customer for use of the ATM 606. The keypad 604 may provide the customer means for inputting a pin number identification. In this way, the keypad 604 enables the customer to input their pin number into the ATM 606. In some embodiments, the pin number inputted on the keypad 604 may be read by the system. After the pin number has been read, the ATM 606 may receive the pin number and provide authentication of the identification with the financial institution system.

The display 602 provides a means for displaying information related to the customer's ATM transaction. Display information may be, but is not limited to display of interfaces, such as the start-up interface and an ATM transaction interface. In some embodiments, the display 602 is a touch screen display module The user may provide physical resource distribution documents for deposit via the deposit receptacle 616. The user may provide one or more checks at a time into the deposit receptacle 616 for processing into an account associated with the user.

FIG. 4 is a flow diagram illustrating a process for integrating the mobile network short wave triangulation system 400, in accordance with one embodiment of the present disclosure. As illustrated in block 410, the process 400 is initiated by identifying computer terminal nodes in areas with obstacles or obstructions. In this way, obstacles or obstructions include walls, buildings, or the like that may affect long wave mobile network transmissions. These obstructions cause the mobile network strength to lag in comparison to locations without obstructions. The computer terminal nodes may be one or more ATM devices within an area, such as within a city.

Next, as illustrated in block 420, the process 400 continues by integrating and activating a short wave beacon within the computer terminal nodes. In this way, the system utilized the ATM device to integrate a beacon into the computer terminal. As such, the system may convert the ATM device short distance communication applications in order to redistribute these communication applications into a beacon for mobile network boosting. As such, the system integrates into the ATM and uses the ATM technology to generate the beacon.

The process 400, then continues to link the computer terminal nodes together to form one or more triangulations of nodes, as illustrated in block 430. As such, the system identifies computer terminal nodes located within short wave communication of each other and triangulate them together around where a user using a mobile network may be. In this way, the system creates triangulated linkages between computer terminals to triangulate short wave mobile network signals for mobile network boosting via beacons associated with the computer terminals, as illustrate in block 440.

Finally, as illustrated in block 450, the process 400 is completed by activating the beacons associated with the computer terminal nodes to boost any user active mobile networks within a triangulation of the computer terminal nodes with the beacons.

FIG. 5 is a flow diagram illustrating a process for using beacons for active mobile network boosting via the triangulation system 300, in accordance with one embodiment of the present disclosure. As illustrated in block 310, the process 300 is initiated by identifying an active mobile network connected user device. In this way, the system may identify a user using a mobile network to conduct a telephone call, text message, or use the mobile network to access the internet or the like. The system may do so based on identifying the active network usage by one or more computer terminal nodes near the user active over the network.

As illustrated in block 320, the process 300 continues by determining the location of the active mobile network connected user device. In this way, the system may identify the location of the user device based on near field communication or the like matching between the user device and one or more the computer terminal nodes.

Once the location is identified, the system may identify if one or more obstructions are possible in that location, this may be in the form of buildings, walls, or obstacles that may affect long wave mobile network communication strength. In this way, the system may identify connectivity issues associated with the active mobile network connected user device base on those obstructions, as illustrated in block 330.

Next, as illustrated in block 340, the process 300 continues by identifying computer terminal nodes in short wave range of the active mobile network. As such, the computer terminal nodes may be linked together with the same entity or on the same network to perform computer terminal node tasks. The system may identify the one or more computer terminal nodes within short wave range of the active mobile network. In this way, the system identifies the computer terminal nodes near the user using their user device. Once the computer terminal nodes are identified, the computer terminal nodes are triangulated together and the beacons associated with the triangulated computer terminal nodes are activated, as illustrated in block 350. In this way, the beacons are triangulated and activate short wave mobile network signals to boost signal strength of the active mobile network connected user device.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for short wave triangulation network boosting, the system comprising:
   one or more memory devices with computer-readable program code stored thereon;
   one or more communication devices; and
   one or more processing devices operatively coupled to the one or more memory devices and the one or more communication devices, wherein the one or more processing devices are configured to execute the computer-readable program code to:
   integrate a mobile network beacon into existing applications at computer terminal nodes;
   identify an active mobile network connected user device, wherein the active mobile network connected user device is identified by the computer terminal node, wherein the computer terminal node is an automated teller machine (ATM), and wherein the ATM comprises an image capture device configured to capture real-time video streams and images of a predetermined proximity area;
   identify one or more obstructions located in a geographic area of the computer terminal node, wherein the one or more obstructions causes one or more connectivity issues for the active mobile network connected user device;
   authenticate, using the ATM, a user associated with the active mobile network connected user device using multifactor authentication and facial recognition via the image capture device;
   triangulate the active mobile network connected user device location between the computer terminal nodes;
   activate the mobile network beacon on the computer terminal nodes that triangulate the active mobile network connected user device; and
   transmit short wave communications from the computer terminal nodes to the active mobile network connected user device.

2. The system of claim 1, wherein integrating mobile network beacon components into existing applications at the computer terminal node further comprises accessing near field and short wave communications available to the computer terminal node.

3. The system of claim 1, further comprising identifying one or more computer terminal nodes within a mobile network and connect the one or more computer terminal nodes for triangulation.

4. The system of claim 1, wherein the active mobile network connected user device is a weak network connection due to obstructions in a geographical area of the user device.

5. The system of claim 1, wherein transmitting short wave communications from the computer terminal nodes to the active mobile network connected user device generates a mobile network connection boost for the user device.

6. The system of claim 1, wherein the mobile network beacon comprises a 5G booster module for transmission and boosting of a mobile network using short wave communication.

7. A computer program product for short wave triangulation network boosting, the computer program product comprising at least one non-transitory computer readable medium having computer-readable program code portions embodied therein, the computer-readable program code portions comprising:
   an executable portion configured for integrating a mobile network beacon into existing applications at computer terminal nodes;
   an executable portion configured for identifying an active mobile network connected user device, wherein the active mobile network connected user device is identified by the computer terminal node, wherein the computer terminal node is an automated teller machine (ATM), and wherein the ATM comprises an image capture device configured to capture real-time video streams and images of a predetermined proximity area;
   an executable portion configured for identifying one or more obstructions located in a geographic area of the computer terminal node, wherein the one or more obstructions causes one or more connectivity issues for the active mobile network connected user device;
   an executable portion configured for authenticating, using the ATM, authenticate a user associated with the active mobile network connected user device using multifactor authentication and facial recognition via the image capture device;
   an executable portion configured for triangulating the active mobile network connected user device location between the computer terminal nodes;
   an executable portion configured for activating the mobile network beacon on the computer terminal nodes that triangulate the active mobile network connected user device; and
   an executable portion configured for transmitting short wave communications from the computer terminal nodes to the active mobile network connected user device.

8. The computer program of claim 7, wherein integrating mobile network beacon components into existing applications at the computer terminal node further comprises accessing near field and short wave communications available to the computer terminal node.

9. The computer program of claim 7, further comprising an executable portion configured for identifying one or more computer terminal nodes within a mobile network and connect the one or more computer terminal nodes for triangulation.

10. The computer program of claim 7, wherein the active mobile network connected user device is a weak network connection due to obstructions in a geographical area of the user device.

11. The computer program of claim 7, wherein transmitting short wave communications from the computer terminal nodes to the active mobile network connected user device generates a mobile network connection boost for the user device.

12. The computer program of claim 7, wherein the mobile network beacon comprises a 5G booster module for transmission and boosting of a mobile network using short wave communication.

13. A computer-implemented method for short wave triangulation network boosting, the computer-implemented method comprising:
- providing a computing system comprising a computer processing device and a non-transitory computer readable medium, where the computer readable medium comprises configured computer program instruction code, such that when said instruction code is operated by said computer processing device, said computer processing device performs the following operations:
- integrating a mobile network beacon into existing applications at computer terminal nodes;
- identifying an active mobile network connected user device, wherein the active mobile network connected user device is identified by the computer terminal node, wherein the computer terminal node is an automated teller machine (ATM), and wherein the ATM comprises an image capture device configured to capture real-time video streams and images of a predetermined proximity area;
- identifying one or more obstructions located in a geographic area of the computer terminal node, wherein the one or more obstructions causes one or more connectivity issues for the active mobile network connected user device;
- authenticating, using the ATM, a user associated with the active mobile network connected user device using multifactor authentication and facial recognition via the image capture device;
- triangulating the active mobile network connected user device location between the computer terminal nodes;
- activating the mobile network beacon on the computer terminal nodes that triangulate the active mobile network connected user device; and
- transmitting short wave communications from the computer terminal nodes to the active mobile network connected user device.

14. The computer-implemented method of claim 13, wherein integrating mobile network beacon components into existing applications at the computer terminal node further comprises accessing near field and short wave communications available to the computer terminal node.

15. The computer-implemented method of claim 13, further comprising identifying one or more computer terminal nodes within a mobile network and connect the one or more computer terminal nodes for triangulation.

16. The computer-implemented method of claim 13, wherein the active mobile network connected user device is a weak network connection due to obstructions in a geographical area of the user device.

17. The computer-implemented method of claim 13, wherein transmitting short wave communications from the computer terminal nodes to the active mobile network connected user device generates a mobile network connection boost for the user device.

* * * * *